United States Patent
Shotey et al.

(10) Patent No.: US 8,314,332 B1
(45) Date of Patent: Nov. 20, 2012

(54) CONFIGURABLE ELECTRICAL BOX

(75) Inventors: Marcus J. Shotey, Scottsdale, AZ (US);
Jeffrey P. Baldwin, Pheonix, AZ (US);
Richard L. Cleghorn, Tempe, AZ (US);
Thomas A. Miserendino, Gilbert, AZ
(US); Bernie Noll, Mesa, AZ (US); **John
Klein**, Gilbert, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 13/052,875

(22) Filed: Mar. 21, 2011

Related U.S. Application Data

(63) Continuation of application No. 12/366,086, filed on Feb. 5, 2009, now Pat. No. 7,910,826.

(60) Provisional application No. 61/093,502, filed on Sep. 2, 2008.

(51) Int. Cl.
*H02G 3/08* (2006.01)

(52) U.S. Cl. ............... 174/50; 174/53; 174/58; 174/64; 439/535; 248/906

(58) Field of Classification Search ............... 174/50, 174/58, 53; 439/535; 248/906; 220/507, 220/526, 4.02
See application file for complete search history.

(56) References Cited

U.S. PATENT DOCUMENTS

| | | |
|---|---|---|
| 4,673,097 A | 6/1987 | Schuldt |
| 5,257,487 A * | 11/1993 | Bantz et al. ................. 52/220.1 |
| 5,486,650 A | 1/1996 | Yetter |
| 5,594,207 A | 1/1997 | Fabian et al. |
| 5,839,594 A * | 11/1998 | Barbour ........................ 220/3.7 |
| 6,576,835 B1 | 6/2003 | Ford et al. |
| 6,653,561 B2 | 11/2003 | Lalancette et al. |
| 6,774,307 B2 | 8/2004 | Kruse et al. |
| 6,955,559 B2 | 10/2005 | Pyrros |
| 7,098,399 B1 | 8/2006 | Gretz et al. |

* cited by examiner

*Primary Examiner* — Dhirubhai R Patel
(74) *Attorney, Agent, or Firm* — Booth Udall, PLC

(57) ABSTRACT

A configurable electrical box includes an electrical box having a wall structure that defines an internal space, a front open end, and a rear open end. The wall structure includes at least one pair of opposing walls. In addition, at least two slots disposed through at least one wall of the pair of opposing walls. A dividing plate is slidably coupled with one of the at least two slots and is positionable between an engaged position and an unengaged position. The dividing plate is in contact with both of the pair of opposing walls when in the engaged position.

20 Claims, 7 Drawing Sheets

CONFIGURABLE ELECTRICAL BOX

CROSS REFERENCE TO RELATED APPLICATIONS

This document claims the benefit of the filing date of U.S. Provisional Patent Application 61/093,502 to Shotey, et al. entitled "Configurable Electrical Box," which was filed on Sep. 2, 2008 and U.S. patent application Ser. No. 12/366,086 to Shotey et al. entitled "CONFIGURABLE ELECTRICAL BOX" which was filed on Feb. 5, 2009 and is currently pending, the disclosures of which are hereby incorporated herein by reference.

BACKGROUND

1. Technical Field

Aspects of the present documents relate generally to configurable electrical boxes.

2. Background Art

Electrical devices and outlets are typically installed in electrical boxes within walls or other structural elements. Such electrical boxes typically have either a single open end in which an electrical device may be mounted, or two open ends that are separated by a fixed divider placed within an internal space of the electrical box. Electrical outlets typically have a voltage output of about 120 volts for a standard electrical outlet, although may have higher outputs depending upon the requirements of a particular application. Such outlets are commonly called high-voltage outlets. Electrical codes typically require high-voltage outlets to be enclosed by a box structure.

SUMMARY

Aspects of this document relate to gangable electrical boxes.

In one aspect, a configurable electrical box comprises an electrical box having a wall structure that defines an internal space, a front open end, and a rear open end. The wall structure comprises at least one pair of opposing walls. At least two slots are disposed through at least one wall of the pair of opposing walls. In addition, a dividing plate is slidably coupled with one of the at least two slots and is positionable between an engaged position and an unengaged position. The dividing plate is in contact with both of the pair of opposing walls in the engaged position.

Particular implementations may include one or more of the following. The at least one pair of opposing walls may comprise opposing vertical side walls and the at least two slots may comprise vertical slots disposed in at least one of the opposing vertical side walls. The at least one pair of opposing walls may comprise opposing horizontal walls and the at least two slots may comprise horizontal slots disposed in at least one of the opposing vertical side walls. One slot may be located about midway between the front open end and the rear open end. When the dividing plate is in the engaged position, the dividing plate may intersect the internal space of the electrical box. One slot may be located adjacent to the rear open end. When the dividing plate is in the engaged position, the dividing plate may enclose the rear open end of the electrical box. One slot may be located one of: between the front open end and a midpoint between the front open end and the rear open end, and between the rear open end and a midpoint between the rear open end and the front open end. When the dividing plate is in the engaged position, the dividing plate may intersect the internal space of the electrical box. One of the front open end and rear open end may comprise a mud ring.

In another aspect, a configurable electrical box comprises an electrical box having a wall structure that defines an internal space, a front open end, and a rear open end. The wall structure comprises opposing vertical side walls. In addition, at least two vertical slots are disposed through at least one of the opposing vertical side walls. A dividing plate is slidably coupled with one of the at least two vertical slots and is positionable between an engaged position and an unengaged position. Also, the dividing plate is in contact with both of the opposing vertical side walls when it is in the engaged position.

Particular implementations may include one or more of the following. One vertical slot may be located about midway between the front open end and the rear open end. When the dividing plate is in the engaged position, the dividing plate may intersect the internal space of the electrical box. One vertical slot may be located adjacent to the rear open end. When the dividing plate is in the engaged position, the dividing plate may enclose the rear open end of the electrical box. One vertical slot may be located one of: between the front open end and a midpoint between the front open end and the rear open end, and between the rear open end and a midpoint between the rear open end and the front open end. When the dividing plate is in the engaged position, the dividing plate may intersect the internal space of the electrical box.

In still another aspect, a method of configuring a configurable electrical box comprises installing within a building structure a configurable electrical box. The method additionally comprises inserting a dividing plate into a slot through one of a pair of opposing walls of the configurable electrical box. The method further comprises engaging the dividing plate such that the dividing plate is in contact with both of the pair of opposing walls.

Particular implementations may include one or more of the following. Inserting the dividing plate may comprise intersecting an internal space of the electrical box by inserting the dividing plate into a slot that is located about midway between the front open end and the rear open end. Inserting the dividing plate may comprise enclosing the rear open end of the electrical box by inserting the dividing plate into a slot that is adjacent to the rear open end of the electrical box.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

A gangable electrical unit will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation of a configurable electrical box and/or assembly procedures for a configurable electrical box will become apparent from this disclosure. Accordingly, for example, although particular electrical boxes, wall structures, opposing walls, front open ends, rear open ends, slots, and dividing plates are disclosed, such electrical boxes, wall structures, opposing walls, front open ends, rear open ends, slots, dividing plates, and implementing components may comprise any shape, size, style, type, model, version, measurement, concentration, material, quantity, and/or the like as is known in the art for such gangable electrical units, consistent with the intended operation of a configurable electrical box.

Figure 1:
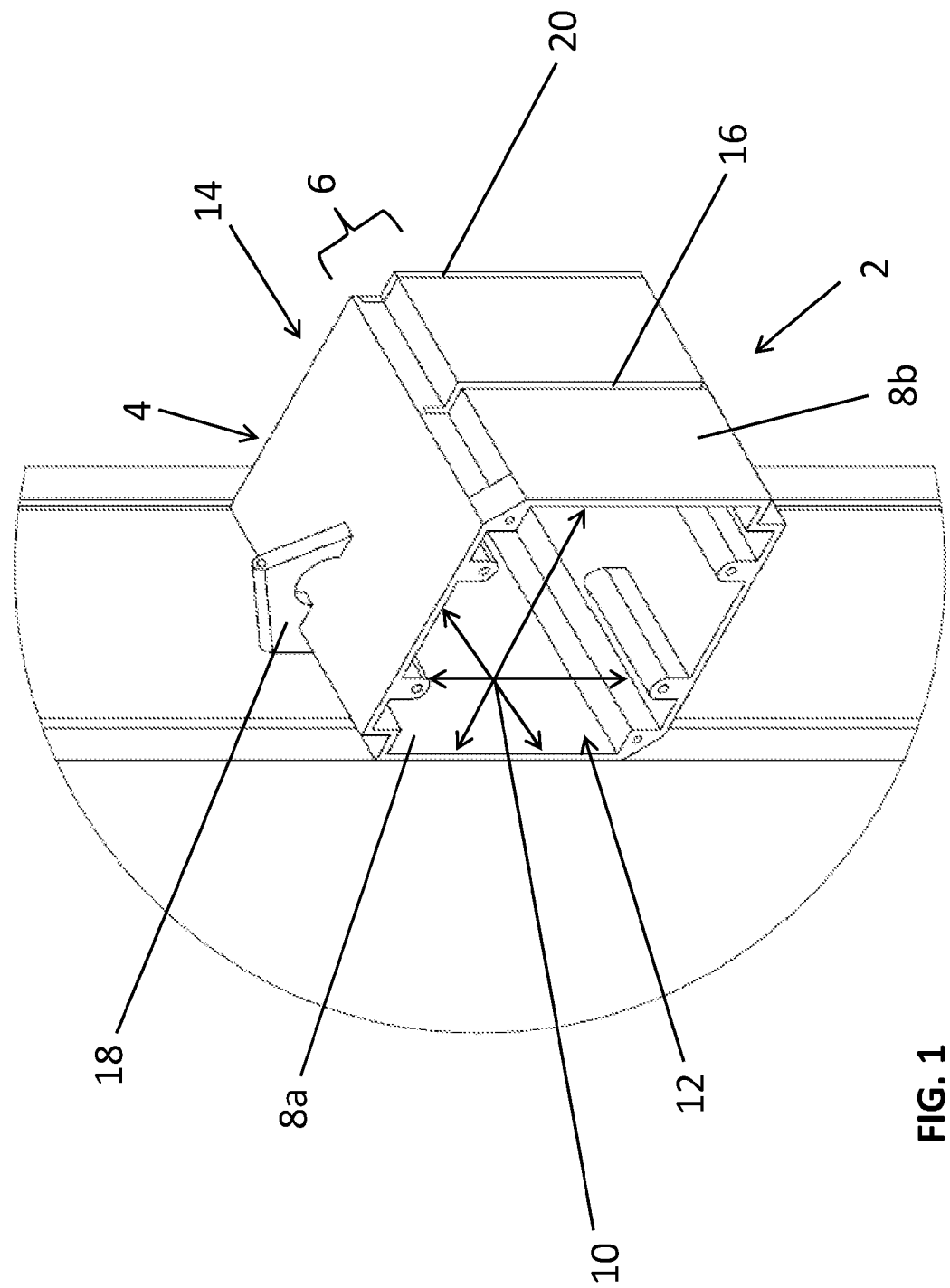
FIG. 1 is a perspective view of a first particular implementation of a configurable electrical box.
Figure 2:
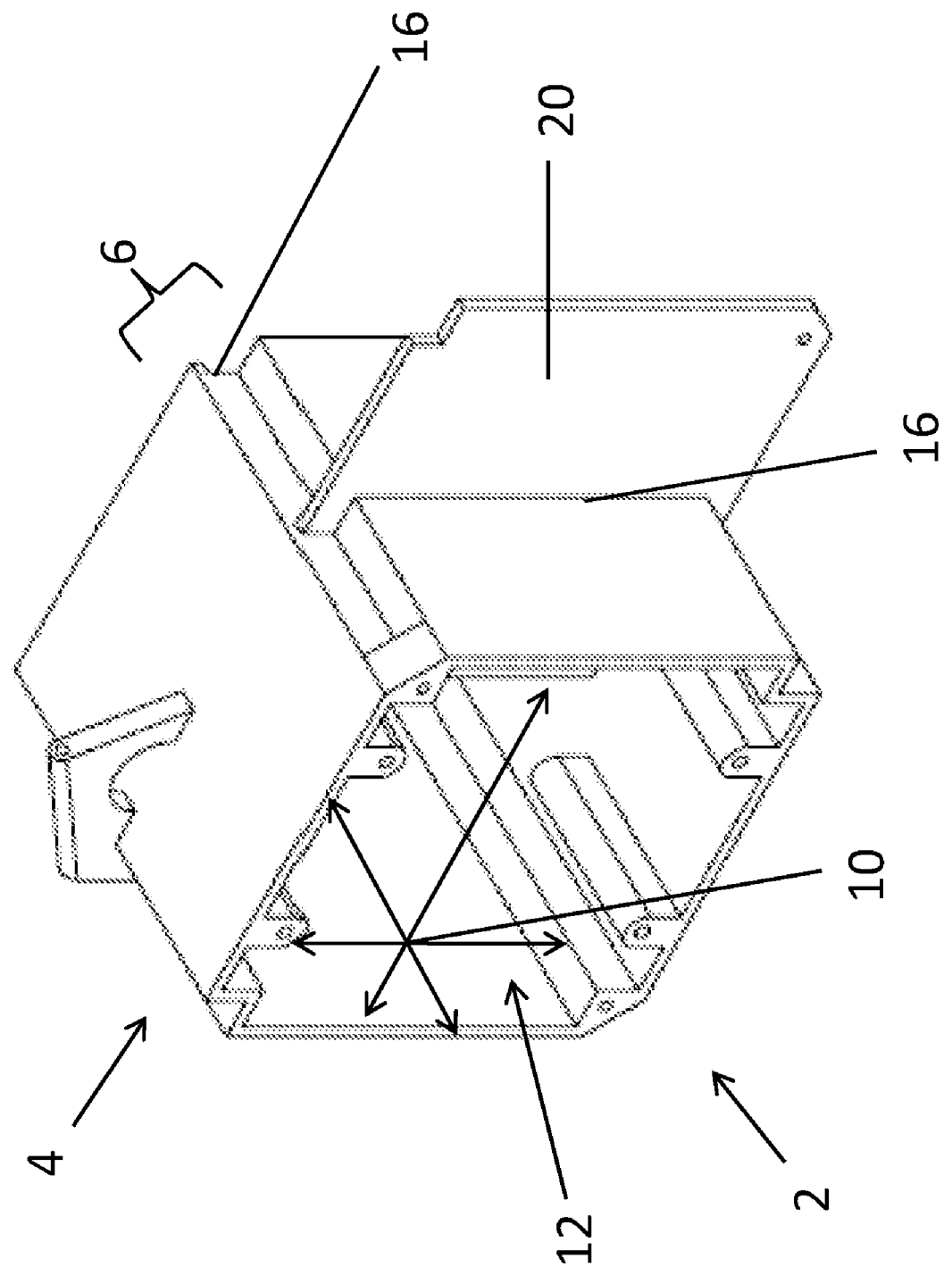
FIG. 2 is a perspective view of a first particular implementation of a configurable electrical box with a dividing plate in an unengaged position.
Figure 3:
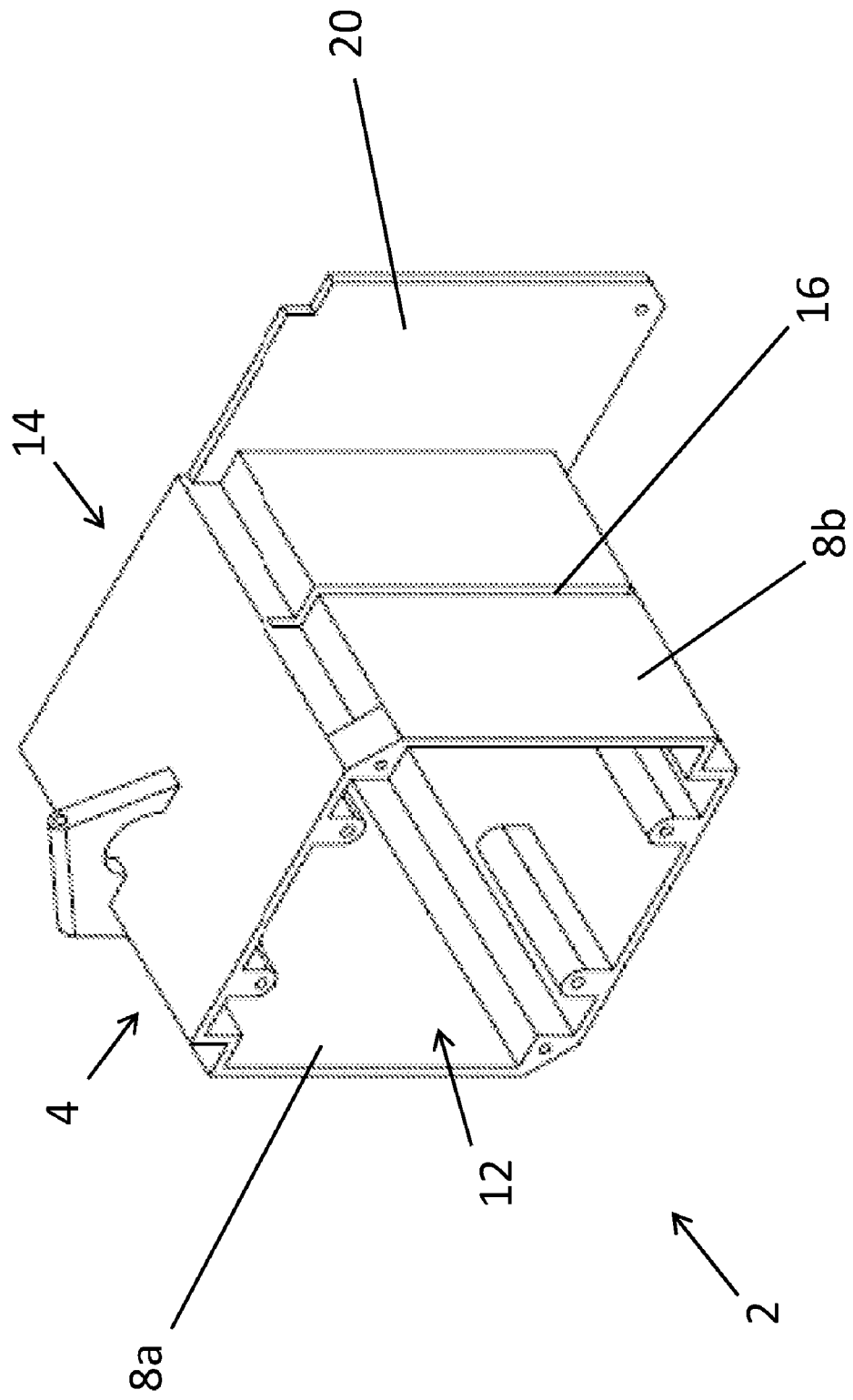
FIG. 3 is a perspective view of a first particular implementation of a configurable electrical box with a dividing plate in an unengaged position adjacent to the rear open end.

There are a variety of configurable electrical box implementations contemplated, disclosed herein and made clear from the present disclosure. FIGS. 1-3 illustrate a first particular implementation of a configurable electrical box. Configurable electrical box 2 is shown in conjunction with a wall structure in FIG. 1, and alone in FIGS. 2-3. Configurable electrical box 2 (and other particular implementations of configurable electrical boxes described herein) are used to reconfigure an electrical box from a single configuration having one open end and configured to accept a single electrical device, to a double electrical box configuration having two open ends and configured to receive two electrical devices. A double electrical box configuration may be particularly useful when mounting the box in a thin wall or a free-standing column, so that the same electrical box can be used to mount two different electrical devices (one in a front portion of the double configuration box, and one in a rear portion of the double configuration box).

Accordingly, configurable electrical box 2 may be installed within a structural element (such as a wall, door, column, post, beam, or the like) in order to allow for the installation of one or more electrical devices and/or outlets therein. Configurable electrical box 2 may be used for both low-voltage and high-voltage applications, depending upon the particular configuration of the configurable electrical box 2 being used. Specifically, electrical codes typically require high-voltage outlets to be enclosed by a box structure, but do not require the same of low-voltage outlets. Accordingly, those configurations of configurable electrical box 2 where electrical box 4 is enclosed may be suitable for high-voltage applications. While electrical box 4 has been depicted herein as double-gang, it may be other size gangs.

Referring specifically to FIGS. 1-3, a first particular implementation of a configurable electrical box is illustrated. Gangable electrical unit 2 comprises electrical box 4, which includes wall structure 6. Wall structure 6 comprises at least one pair of opposing walls 8a and 8b. While the pair of opposing walls 8a and 8b illustrated are shown as opposing vertical side walls, it will be understood that the pair of opposing walls 8a and 8b may alternately be referred to as opposing horizontal top and bottom walls. In any event, at least two slots 16 are disposed through at least one wall of the pair of opposing walls 8a and 8b. In those particular implementations where the pair of opposing walls 8a and 8b comprise opposing vertical side walls, the at least two slots 16 may comprise vertical slots through at least one of the pair of opposing walls 8a and 8b. In addition, in those particular implementations where the pair of opposing walls 8a and 8b comprise opposing horizontal top and bottom walls, the at least two slots 16 may comprise horizontal slots through at least one of the pair of opposing walls 8a and 8b.

Still referring to FIGS. 1-3, wall structure 6 defines an internal space 10, which may be reconfigured according to the disclosures contained herein. Wall structure 6 further defines front open end 12 and rear open end 14, which may be reconfigured/enclosed according to the disclosures contained herein. The reconfiguration of internal space 10, the reconfiguration/enclosure of rear open end 14, and other reconfigurations possible with the disclosures contained herein are made possible through the mechanical cooperation of at least one of the at least two slots 16 and a dividing plate 20. Specifically, dividing plate 20 comprises a substantially flat body that is slidably coupled with one or more of the at least two slots 16 and is positionable between an engaged position (FIG. 1) and an unengaged position (FIGS. 2-3). With respect to any of the particular implementations described herein, the at least two slots 16 may be initially covered or enclosed by an insert that may be removed, or a thin film that may be easily punctured or cut out by a user. If it is desired that the box be divided, the insert may be removed and/or the thin film may be punctured (such as by a screw driver or utility knife) to create an open slot to allow the dividing plate 20 to be inserted into the slot 16. Since electrical codes may require that an electrical box, such as the electrical box 4, be enclosed, a user may elect to keep intact the thin film over any unused slots 16 such that electrical box remains enclosed (with one or more of the dividing plates 20 engaged in any open slots 16).

When dividing plate 20 is in its engaged position, the dividing plate is in contact with both of the opposing walls 8a and 8b. In some particular implementations, dividing plate 20 may be fixed in place via gravity, a pressure-fit, a snap-fit, a fastener, or other detenting arrangement. It should be understood that as used herein, "slot" may comprise an opening through which the dividing plate 20 slides, or may simply comprise an opening into which the dividing plate sits and is retained. For example, with the rear open end 14, the slot is an opening in the rear end that allows the dividing plate to seat against the rear open end 14 and be maintained in place. In the particular implementation of FIG. 1, the dividing plate 20 can slide into its position, but it is not required to do so to enter the slot. It may snap into position or simply be placed in a recessed position against the rear open end 14.

In any of the particular implementations disclose herein, at least one of the at least two slots 16 may be located about midway between front open end 12 and rear open end 14. In those implementations where at least one of the at least two slots 16 is located about midway (or at some other distance) between front open end 12 and rear open end 14, when dividing plate 20 is in the engaged position the dividing plate intersects internal space 10 of the electrical box into two equal halves. In other particular implementations, at least one of the at least two slots 16 may be located adjacent to rear open end 14. In those implementations where at least one of the at least two slots 16 is located adjacent to rear open end 14, when dividing plate 20 is in the engaged position the dividing plate encloses rear open end 14 of the electrical box. In still other particular implementations, at least one of the at least two slots 16 may be located anywhere along a continuum between front open end 12 and rear open end 14. In those implementations where at least one of the at least two slots 16 is located about anywhere along a continuum between front open end 12 and rear open end 14, when dividing plate 20 is in the engaged position the dividing plate intersects internal space 10 of the electrical box into two unequal portions.

Therefore, with respect to any of the implementations of a configurable electrical box disclosed herein, a user may use dividing plate 20 to divide internal space 10 into equal halves (FIG. 2) or into unequal portions, depending upon the particular needs of the user and requirements of a particular application. In addition, a user may use dividing plate 20 to enclose rear open end 14, thereby creating a "deep" electrical box (as shown in FIGS. 1 and 3). Whether a user uses dividing plate 20 (in conjunction with one or more slots 16) to configure a "deep" electrical box to have only one open end (which may accommodate only one electrical device), to configure an electrical box to have an internal space that is divided equally (having two open ends and configured to receive two electrical devices), or to configure an electrical box to have an internal space that is divided unequally (having two open ends and configured to receive two electrical devices), it will be understood that the resulting configured boxes are "enclosed" by the cooperation of wall structure 6 and dividing plate 20, and are thus suitable for use in high-voltage applications.

Figure 4:
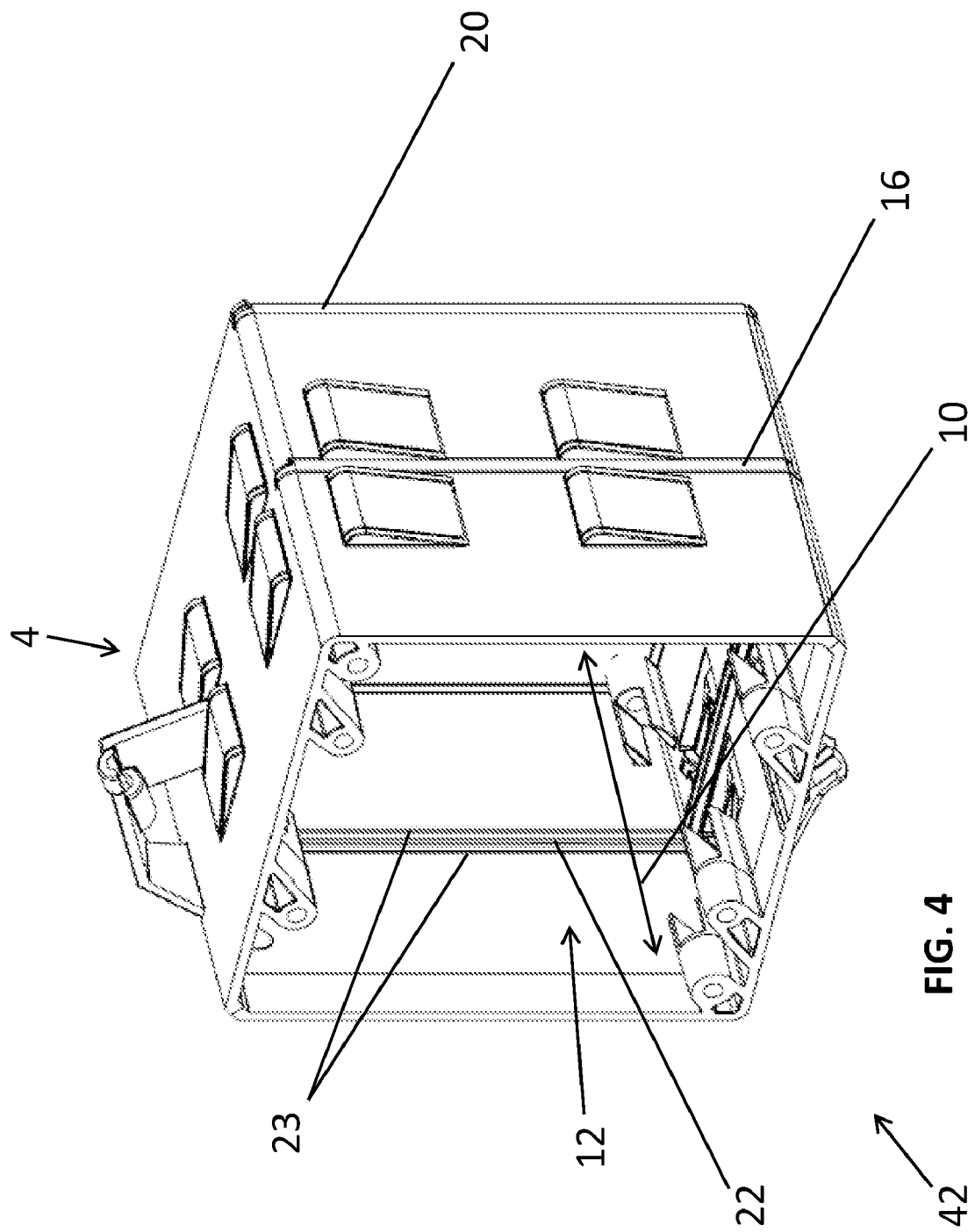
FIG. 4 is a perspective view of a first particular implementation of a configurable electrical box with a dividing plate in an engaged position adjacent to the rear open end.
Figure 5:
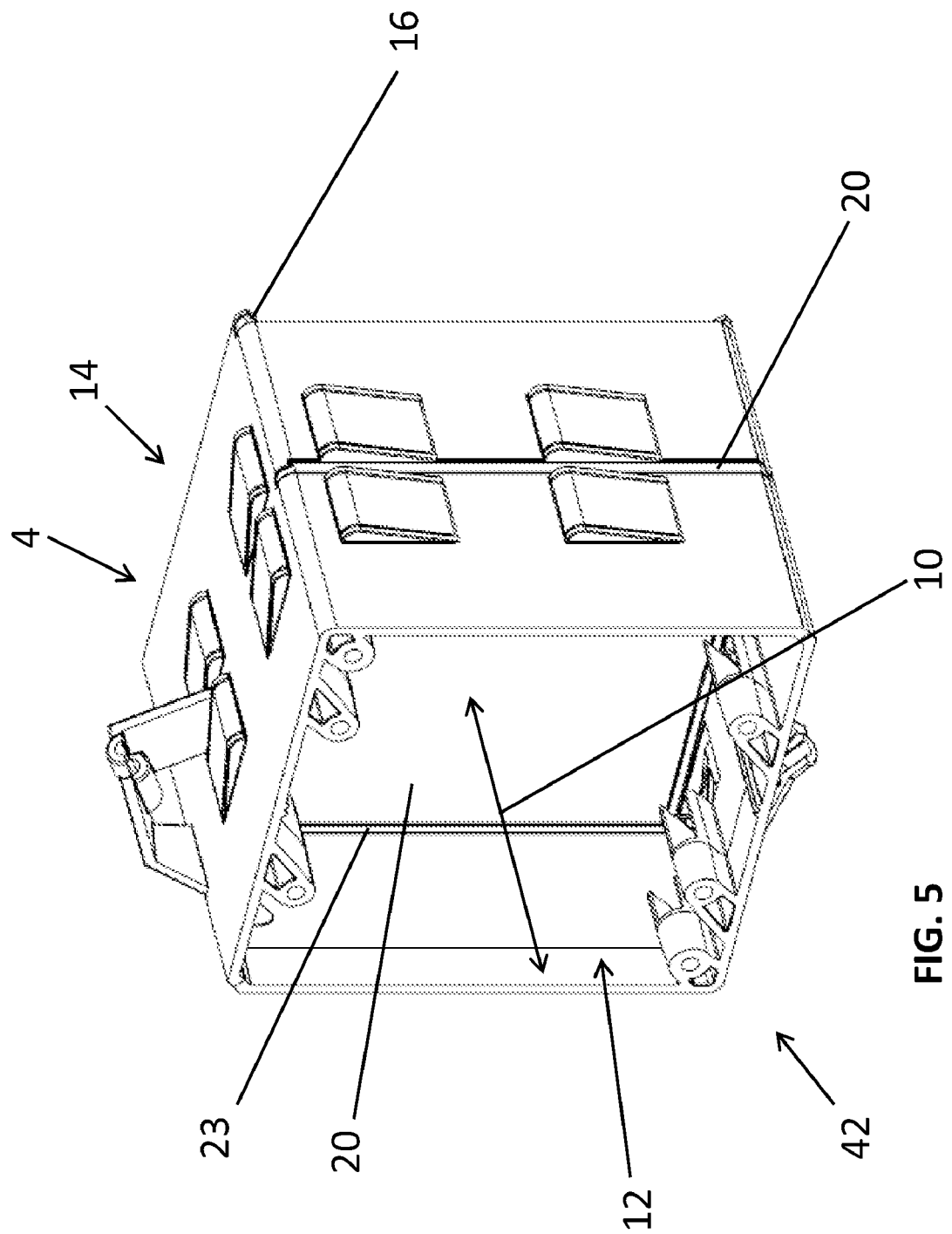
FIG. 5 is a perspective view of a first particular implementation of a configurable electrical box with a dividing plate in an engaged position in a slot located about midway between the front open end and the rear open end.

Turning now to FIGS. 4 and 5, a second particular implementation of a configurable electrical box is illustrated. Configurable electrical box 42 comprises guide track 22. Guide track 22 may be provided in conjunction with one or more of the at least two slots 16 to assist in the smooth or at least directed sliding of dividing plate 20 as it is slid between unengaged and engaged positions. In particular, guide track 22 may comprise a notch, groove or channel (which may be provided between two opposing raised track members 23, as shown in FIG. 2), in which dividing plate 20 may slide as it is positioned between unengaged and engaged positions. It will be understood that in those implementations having guide track 22, that guide track 22 is provided on a wall between the pair of opposing walls 8a and 8b containing slot 16 such that, when dividing plate 20 is inserted in slot 16 and is moved towards an engaged position, an edge of dividing plate 20 is in contact with, and travels along, guide track 22.

A comparison of FIG. 4 to FIG. 5 is further helpful in illustrating one non-limiting example of the versatility of a configurable electrical box. In particular, FIG. 4 illustrates a "deep" electrical box configuration of configurable electrical box 42, wherein rear open end 14 is reconfigured/enclosed by the placement of dividing plate 20 in slot 16, which is located adjacent to rear open end 14. The resulting deep electrical box is open only on front open end 12 (which may be covered by a cover plate). Alternatively, FIG. 5 illustrates a "double" electrical box configuration of configurable electrical box 42, wherein front open end 12 and rear open end 14 are both left open, but the internal space is intersected by the placement of dividing plate 20 in a slot 16 that is located about midway between front open end 12 and rear open end 14. Additional dividing plate placements are possible, depending upon the particular location of one or more slots 16 which, as noted above, may be located anywhere along a continuum between front open end 12 and rear open end 14.

Figure 6:
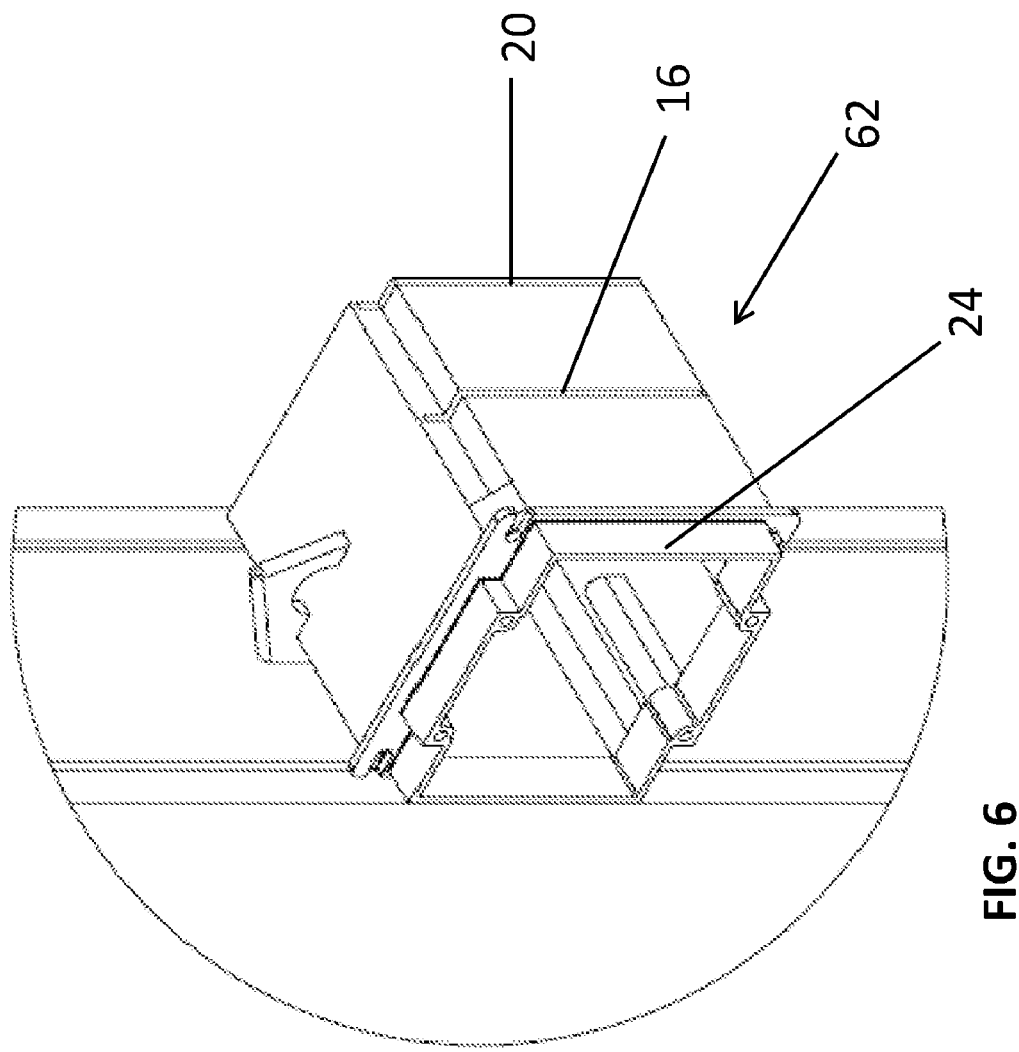
FIG. 6 is a perspective view of a second particular implementation of a configurable electrical box having a mud ring.
Figure 7:
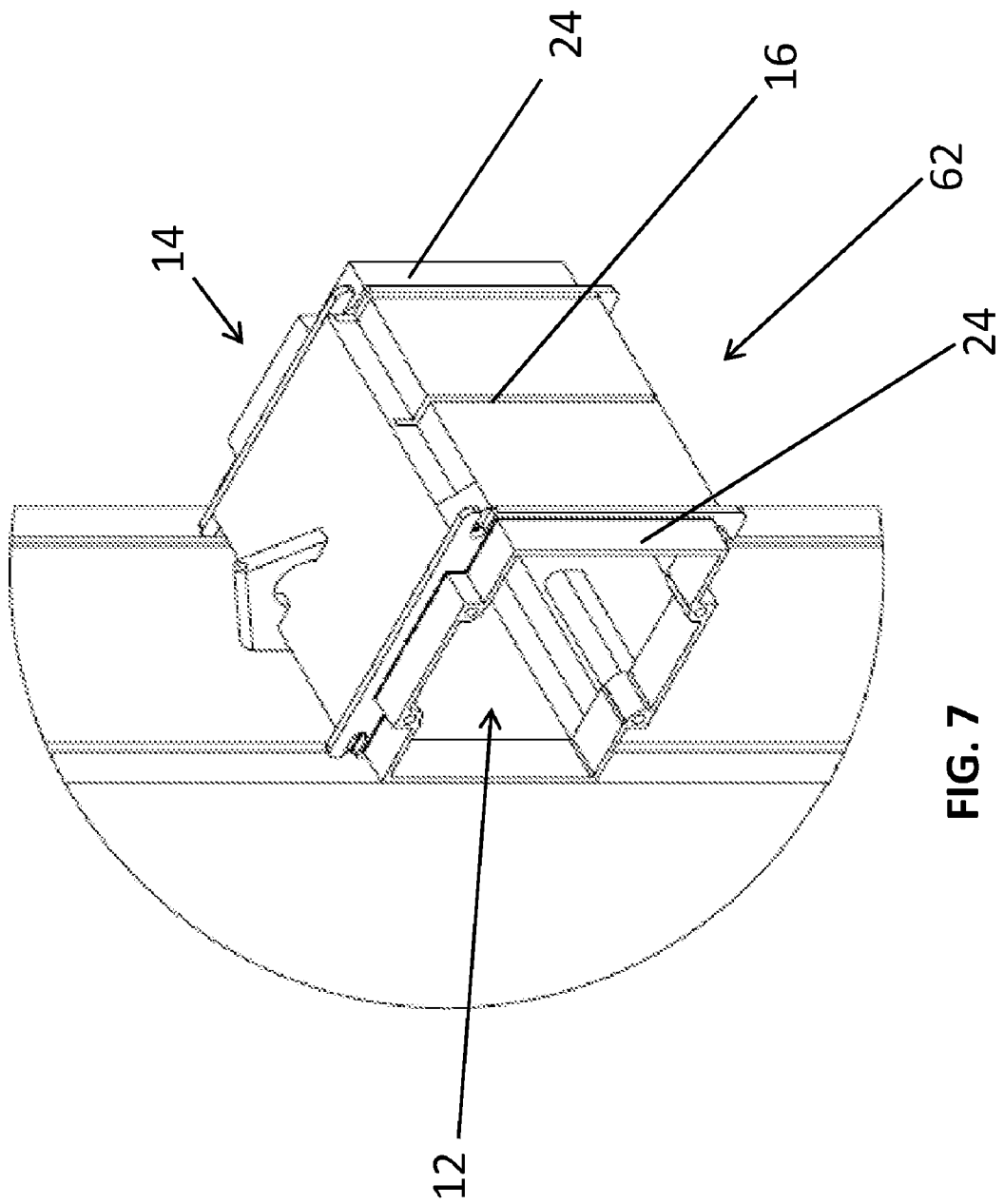
FIG. 7 is a perspective view of a second particular implementation of a configurable electrical box having two mud rings.

Referring now to FIGS. 6 and 7, a third particular implementation of configurable electrical box is illustrated. Configurable electrical box 62 comprises one or more mud rings 24 positioned around front open end 12 and/or rear open end 14. In particular, with one or more mud rings 24 installed with respect to a configurable electrical box, a sheet of drywall (or other wall compound) may be positioned over one or more mud rings 24 such that one or more mud rings 24 are substantially flush with an outer surface of the finished wall. It will be understood that in those implementations where dividing plate 20 has been used to enclose rear open end 14, that mud ring 24 may not be provided with respect to the enclosed rear open end. Other particular implementations may comprise an electrical device mounting box that on its own extends to a point substantially flush with the outer surface of the finished wall.

It will be understood by those of ordinary skill in the art that the concepts of reconfiguring configurable electrical boxes, as disclosed herein, is not limited to the specific implementations shown herein. For example, it is specifically contemplated that the components included in a particular implementation of a configurable electrical box may be formed of any of many different types of materials or combinations that can readily be formed into shaped objects and that are consistent with the intended operation of a configurable electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical boxes, wall structures, opposing walls, front open ends, rear open ends, slots, and dividing plates and any other components forming a particular implementation of a configurable electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that particular implementations are not limited to the specific components disclosed herein, as virtually any components consistent with the intended operation of a method and/or system implementation for a configurable electrical box may be utilized. Accordingly, for example, although particular electrical boxes, wall structures, opposing walls, front open ends, rear open ends, slots, and dividing plates may be disclosed, such components may comprise any shape, size, style, type, model, version, class, grade, measurement, concentration, material, weight, quantity, and/or the like consistent with the intended operation of configurable electrical box and a method and/or system implementation for a configurable electrical box may be used.

In places where the description above refers to particular implementations of a configurable electrical box, it should be readily apparent that a number of modifications may be made without departing from the spirit thereof and that these implementations may be applied to other configurable electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A configurable electrical box comprising:
an electrical box comprising two opposing vertical side walls and two opposing horizontal side walls that define an internal space, a front open end, and a rear open end opposite the front open end; at least one vertical slot disposed through at least one of the opposing vertical side walls; and a dividing plate coupled to the electrical box, the dividing plate slidable through the at least one of the opposing vertical side walls at the at least one vertical slot and positionable between an engaged position and an unengaged position, wherein when the dividing plate is in the engaged position the dividing plate contacts the sidewall opposite the slot and separates the internal space into two internal spaces.

2. The configurable electrical box of claim 1 wherein the at least one vertical slot is located approximately midway between the front open end and the rear open end.

3. The configurable electrical box of claim 1 wherein when the dividing plate is in the engaged position, the dividing plate intersects the internal space of the electrical box.

4. The configurable electrical box of claim 1 wherein the at least one vertical slot is located adjacent to the rear open end.

5. The configurable electrical box of claim 1 wherein the at least one vertical slot is located adjacent to the front open end.

6. The configurable electrical box of claim 1 wherein the at least one vertical slot is located in one of: between the front open end and a midpoint between the front open end and the rear open end; and between the rear open end and a midpoint between the rear open end and the front open end.

7. The configurable electrical box of claim 1 wherein the at least one vertical slot is a pair of vertical slots.

8. The configurable electrical box of claim 7 wherein one of the pair of vertical slots is located adjacent the front open end and the other of the pair of vertical slots is located adjacent the rear open end.

9. The configurable electrical box of claim 7 wherein one of the pair of vertical slots is located at a midpoint between the front open end and the rear open end.

10. The configurable electrical box of claim 1 wherein the at least one vertical slot is three vertical slots.

11. The configurable electrical box of claim 10 wherein a first of the three vertical slots is located adjacent the front open end, a second of the three vertical slots is located adjacent the rear open end, and a third of the vertical slots is located at a midpoint between the front open end and the rear open end.

12. The configurable electrical box of claim 1 wherein the front open end further comprises a mud ring.

13. The configurable electrical box of claim 1 wherein the rear open end further comprises a mud ring.

14. The configurable electrical box of claim 1 wherein the at least one vertical slot is located adjacent the front open end and the dividing plate is positioned within the at least one vertical slot, the internal space defines a deep wall electrical box.

15. The configurable electrical box of claim 1 wherein when the at least one vertical slot is located adjacent the rear open end and the dividing plate is positioned within the at least one vertical slot, the internal space defines a deep wall electrical box.

16. The configurable electrical box of claim 1 wherein the at least one vertical slot is located at a midpoint between the front open end and the rear open end and the dividing plate is positioned within the at least one vertical slot, the internal space is divided into two equal internal spaces.

17. The configurable electrical box of claim 16 wherein the two equal internal spaces are each capable of receiving an electrical device.

18. A method of configuring a configurable electrical box comprising the steps of: installing within a building structure a configurable electrical box comprising two opposing vertical side walls and two opposing horizontal side walls that define an internal space, a front open end and a rear open end opposite the front open end, and at least one vertical slot extending through one of the two opposing vertical side walls; inserting a dividing plate parallel with the front open end through the one of the two opposing vertical side walls at the vertical slot and separating the internal space into two internal spaces; and engaging the dividing plate such that the dividing plate is in contact with the side wall opposite the vertical slot.

19. The method of claim 18, wherein inserting the dividing plate comprises intersecting an internal space of the electrical box by inserting the dividing plate into the vertical slot, wherein the vertical slot is located about midway between the front open end and the rear open end.

20. The method of claim 18, wherein inserting the dividing plate comprises enclosing the rear open end of the electrical box by inserting the dividing plate into the vertical slot, wherein the vertical slot is adjacent to and parallel with the rear open end of the electrical box.

* * * * *